(12) United States Patent
Juels et al.

(10) Patent No.: US 7,298,243 B2
(45) Date of Patent: Nov. 20, 2007

(54) RADIO FREQUENCY IDENTIFICATION SYSTEM WITH PRIVACY POLICY IMPLEMENTATION BASED ON DEVICE CLASSIFICATION

(75) Inventors: Ari Juels, Brookline, MA (US); John G. Brainard, Sudbury, MA (US)

(73) Assignee: RSA Security Inc., Bedford, MA (US)

( * ) Notice: Subject to any disclaimer, the term of this patent is extended or adjusted under 35 U.S.C. 154(b) by 345 days.

(21) Appl. No.: 10/915,189

(22) Filed: Aug. 10, 2004

(65) Prior Publication Data

US 2005/0099268 A1    May 12, 2005

Related U.S. Application Data

(60) Provisional application No. 60/565,499, filed on Apr. 26, 2004, provisional application No. 60/544,370, filed on Feb. 13, 2004, provisional application No. 60/519,306, filed on Nov. 12, 2003.

(51) Int. Cl.
*H04Q 5/22* (2006.01)

(52) U.S. Cl. .................. 340/10.4; 340/10.32; 340/10.1; 340/572.1

(58) Field of Classification Search ............... 340/10.1, 340/10.32, 10.4, 572.1, 572.4
See application file for complete search history.

(56) References Cited

U.S. PATENT DOCUMENTS

| | | | | |
|---|---|---|---|---|
| 5,008,661 A | * | 4/1991 | Raj | 340/10.51 |
| 5,410,315 A | * | 4/1995 | Huber | 340/10.32 |
| 5,467,081 A | * | 11/1995 | Drews et al. | 340/5.22 |
| 5,673,037 A | * | 9/1997 | Cesar et al. | 340/10.32 |
| 6,172,596 B1 | * | 1/2001 | Cesar et al. | 340/10.41 |
| 6,664,897 B2 | * | 12/2003 | Pape et al. | 340/573.3 |
| 6,970,070 B2 | * | 11/2005 | Juels et al. | 340/10.1 |

(Continued)

OTHER PUBLICATIONS

S.E. Sarma, "Towards the 5¢ Tag," White Paper, Technical Report MIT-AUTOID-WH-006, MIT Auto ID Center, pp. 1-19, Nov. 2001.

(Continued)

*Primary Examiner*—Edwin C. Holloway, III
(74) *Attorney, Agent, or Firm*—Ryan, Mason & Lewis, LLP

(57) ABSTRACT

Methods and apparatus are disclosed for use in an RFID system comprising a plurality of RFID devices and at least one reader which communicates with one or more of the devices. In accordance with an aspect of the invention, identifiers transmitted by the RFID devices are received by the reader. The system determines a classification of at least one of the received identifiers, and implements a privacy policy for data associated with one or more of the received identifiers based at least in part on the determined classification. For example, the given RFID device may be configurable into at least a first state indicative of a first classification, such as a private classification, and a second state indicative of a second classification, such as a public classification. The reader may alter a type of query that it issues based at least in part on the determined classification. Alternatively or additionally, response by the given RFID device to a query received from the reader may be conditioned on the state of the RFID device. The reader may be configured, dynamically or otherwise, so as to issue queries causing such selective responses by the RFID devices.

37 Claims, 3 Drawing Sheets

U.S. PATENT DOCUMENTS

2001/0050922 A1* 12/2001 Tiernay et al. ............... 370/467
2005/0003804 A1* 1/2005 Huomo et al. ............ 455/414.1
2005/0083181 A1* 4/2005 Jalkanen et al. ......... 340/10.34

OTHER PUBLICATIONS

R. Agrawal et al., "Privacy-Preserving Data Mining," Proc. of the ACM SIGMOD Conference on Management of Data, ACM Press, 12 pages, 2000.

D. Chaum, "Untraceable Electronic Mail, Return Addresses, and Digital Pseudonyms," Communications of the ACM, vol. 24, No. 2, 9 pages, Feb. 1981.

M. Mealling, "Auto-ID Object Name Service (ONS) 1.0," Auto-ID Working Draft, 17 pages, Aug. 2003.

M.G. Reed et al., "Protocols Using Anonymous Connections: Mobile Applications," In Security Protocols, Proceedings of the 5th International Workshop, Springer-Verlag LNCS 1361, 11 pages, 1997.

S.A. Weis et al., "Security and Privacy Aspects of Low-Cost Radio Frequency Identification Systems," Proceedings of the First International Conference on Security in Pervasive Computing, 12 pages, 2003.

S.A. Weis, "Security and Privacy in Radio-Frequency Identification Devices," Master of Science Thesis, MIT, pp. 1-79, May 2003.

A. Juels et al., "Squealing Euros: Privacy Protection in RFID-Enabled Banknotes," Financial Crytography, Springer-Verlag, 18 pages, 2003.

U.S. Appl. No. 10/782,309, filed Feb. 19, 2004, "Low-Complexity Cryptographic Techniques for Use with Radio Frequency Identification Devices."

U.S. Appl. No. 10/673,540, filed Sep. 29, 2003, "Method and Apparatus for Selective Blocking of Radio Frequency Identification Devices."

P. Golle et al., "Universal Re-encryption for Mixnets," Springer-Verlag, 14 pages, 2002.

D.L. Brock, "The Electronic Product Code (EPC): A Naming Scheme for Physical Objects," White Paper, MIT-AUTOID-WH-002, MIT Auto-ID Center, http://www.autoidcenter.org., pp. 1-21, Jan. 2001.

Auto-ID Center, Technical Report, "13.56 MHz ISM Band Class 1 Radio Frequency Identification Tag Interface Specification: Recommended Standard, Version 1.0.0," MIT-AUTOID-TR-011, MIT Auto-ID Center, http://autoidcenter.org, pp. 1-31, Feb. 2003.

S.E. Sarma et al., "RFID Systems, Security & Privacy Implications," White Paper, MIT-AUTOID-WH-014, MIT Auto-ID Center, pp. 1-16, Nov. 2002.

S.E. Sarma et al., "Radio-Frequency Identification: Security Risks and Challenges," RSA Laboratories, CryptoBytes, vol. 6, No. 1, pp. 1-32, Spring 2003.

D.W. Engels, "HF Identity Tag Action Group: Scope and Deliverables," Technical Report, MIT-AUTOID-TR-020, MIT Auto-ID Center, pp. 1-5, Jul. 2003.

S. Clark et al., "Auto-ID Savant Specification 1.0," Auto-ID Center, pp. 1-59, Sep. 2003.

* cited by examiner

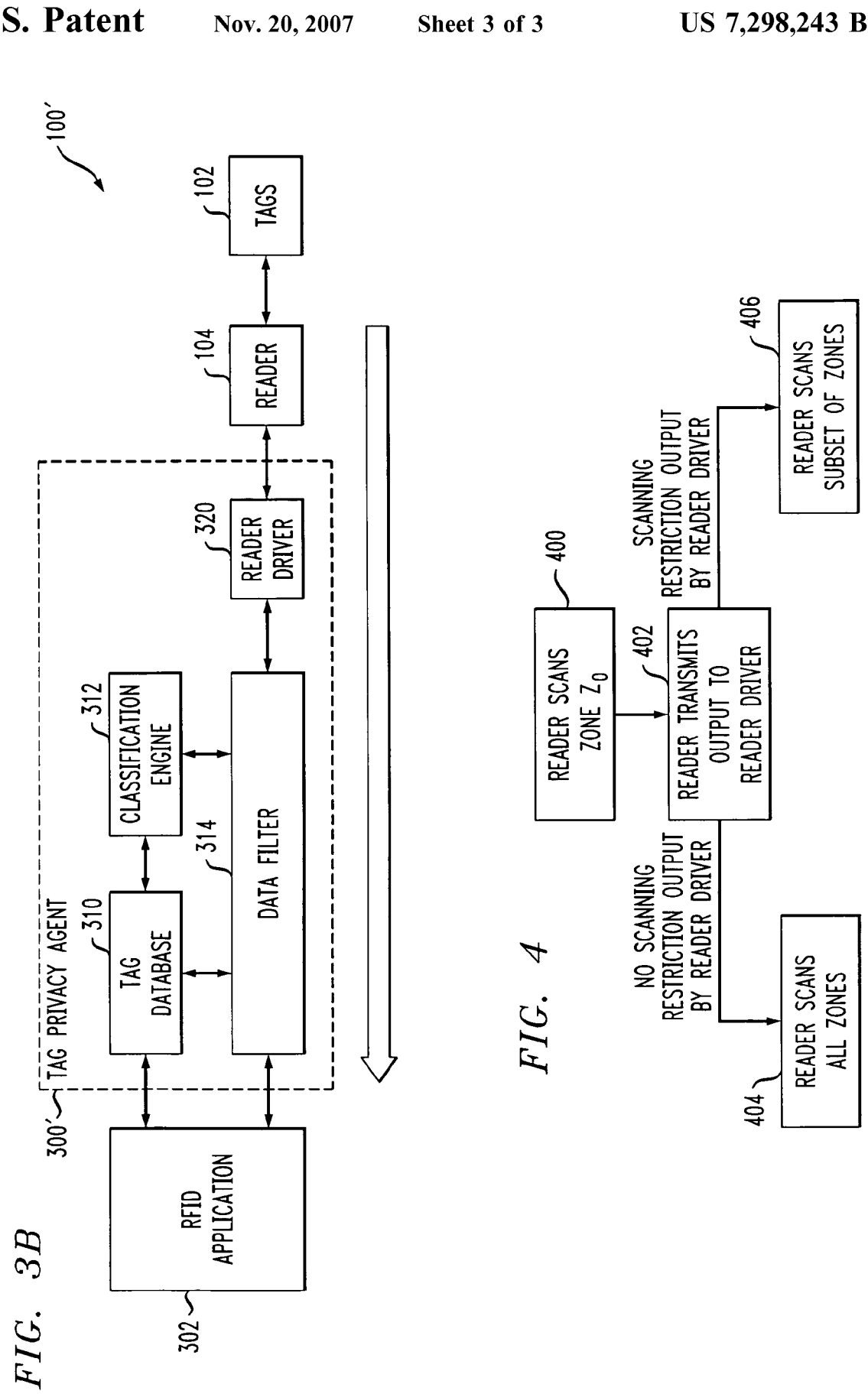

RADIO FREQUENCY IDENTIFICATION SYSTEM WITH PRIVACY POLICY IMPLEMENTATION BASED ON DEVICE CLASSIFICATION

RELATED APPLICATION(S)

The present application claims the priority of U.S. Provisional Patent Application Ser. No. 60/565,499, filed Apr. 26, 2004 and entitled "Soft Blocking: Flexible Blocker Tags on the Cheap," U.S. Provisional Patent Application Ser. No. 60/544,370, filed Feb. 13, 2004 and entitled "Soft Blocking: Flexible Blocker Tags on the Cheap," and U.S. Provisional Patent Application Ser. No. 60/519,306, filed Nov. 12, 2003 and entitled "Tag Privacy Agents (TaPAs): Flexible 'Blocker' Tags on the Cheap," the disclosures of which are incorporated by reference herein.

The present application is also related to U.S. patent application Ser. No. 10/782,309, filed Feb. 19, 2004 and entitled "Low-Complexity Cryptographic Techniques For Use With Radio Frequency Identification Devices," and U.S. patent application Ser. No. 10/673,540, filed Sep. 29, 2003 and entitled "Method And Apparatus For Selective Blocking Of Radio Frequency Identification Devices," both of which are commonly assigned herewith and incorporated by reference herein.

FIELD OF THE INVENTION

The present invention relates generally to radio frequency identification (RFID) tags or other types of RFID devices, and more particularly to techniques for protecting privacy in conjunction with the use of such devices.

BACKGROUND OF THE INVENTION

A conventional RFID tag typically comprises an integrated circuit transceiver capable of transmitting a unique serial number or other identifying information to a nearby reader in response to a query from the reader. Many RFID tags are "passive" in that they do not include a battery or other power source, but instead obtain the power necessary to operate from the query signal itself. RFID tags are expected to replace printed barcodes in consumer product applications. Also, ongoing RFID tag development efforts have led to significant cost and size reductions, which should result in a rapid proliferation of RFID tags into many new areas of use. For example, proposals have recently been made to integrate RFID tags into currency.

The impending ubiquity of RFID tags, however, also poses a potentially widespread threat to consumer privacy. The simplest RFID tag will broadcast its unique identifying information to any nearby reader. An example of an inexpensive RFID tag providing such basic functionality is described in S. E. Sarma, "Towards the five-cent tag," Technical Report MIT-AUTOID-WH-006, MIT Auto ID Center, 2001. This RFID tag transmits a static, 64-to-128-bit identifier on receiving a reader query. The movements of a given consumer or other user can therefore be readily tracked by simply monitoring the RFID tags in goods carried by or otherwise associated with that user.

The above-cited U.S. patent application Ser. No. 10/673, 540 discloses techniques for selective blocking of RFID tags in an RFID system, so as to provide protection of consumer privacy. In an illustrative embodiment, a "blocker" tag interferes with a singulation protocol that a reader uses to communicate individually with other RFID tags. While inexpensive to manufacture in quantity, blocker tags are nonetheless special-purpose devices, and thus introduce a level of complexity that may pose an obstacle to their deployment.

Accordingly, a need exists for a system that offers somewhat weaker privacy protection than complete blocking, but with the benefits of greater privacy policy flexibility and minimal alteration to standard tags or readers.

SUMMARY OF THE INVENTION

The present invention in accordance with one aspect thereof provides techniques for enhanced privacy in an RFID system. The RFID system generally includes a plurality of RFID devices and at least one reader which communicates with one or more of the devices.

In operation, identifiers transmitted by the RFID devices are received by the reader. The system determines a classification of at least one of the received identifiers, and implements a privacy policy for data associated with one or more of the received identifiers based at least in part on the determined classification. For example, the reader may alter a type of query that it issues based at least in part on the determined classification. The data associated with a given received identifier may comprise the identifier itself, and may also or alternatively include other types of data.

In accordance with another aspect of the invention, a given RFID device may be configured to store state information specifying one of at least a first state indicative of a first classification, e.g., a private classification, and a second state indicative of a second classification, e.g., a public classification. The reader may be configured, dynamically or otherwise, to issue a query for which a corresponding response by the given RFID device is conditioned on the state information stored in that device. For example, the stored information may comprise a privacy bit controllable between a first state indicative of a private classification and a second state indicative of a public classification. The reader may be configured to issue a private read command which requests responses from only those RFID devices having a privacy bit in the first state. Other possible queries include, for example, a public read command which requests responses from only those RFID devices having a privacy bit in the second state, or a general read command which requests responses from one or more of the RFID devices without regard to the states of their privacy bits.

In an illustrative embodiment, the classification determination and distribution control are implemented in a privacy agent of the system, the privacy agent comprising a database, a classification engine and a data filter. The database in this embodiment may comprise, by way of example, a set $\{T^i, S_i\}_{i=1}^n$ of device identifiers $T_i$ and additional associated data $S_i$. The classification engine may comprise an algorithm that takes as input a set of identifiers $\{T_i\}_{i=1}^m$ and additional associated data $\{D_i\}_{i=1}^m$ released by the RFID devices upon query by the reader, and outputs particular classifications of the identifiers $\{T_i\}_{i=1}^m$. The data filter may be configured to take as input a set of identifiers $\{T_i\}_{i=1}^m$ and additional associated data $\{D_i\}_{i=1}^m$ released by the RFID devices upon query by the reader, to obtain corresponding classifications from the classification engine, and to output filtered data according to a designated privacy policy of the RFID system.

The RFID system may further include an external auditing capability. Such an arrangement may involve use of a reader driver. The reader driver may be configured to interact with the reader so as to indicate to the reader particular portions of a device identifier space that the reader should scan in implementing a particular privacy policy in the system.

Advantageously, the soft blocking approach in the illustrative embodiment provides greater privacy policy flexibility, and can be implemented without requiring any significant alteration of standard tags or readers.

These and other features and advantages of the present invention will become more readily apparent from the accompanying drawings and the following detailed description.

BRIEF DESCRIPTION OF THE DRAWINGS

FIG. 3B illustrates the manner in which a reader driver can be incorporated into the system as shown in FIG. 3A.

FIG. 4 is a flow diagram of an example soft blocking process of the present invention, with audit capability, suitable for implementation in the RFID system of FIG. 1.

DETAILED DESCRIPTION

Figure 1:
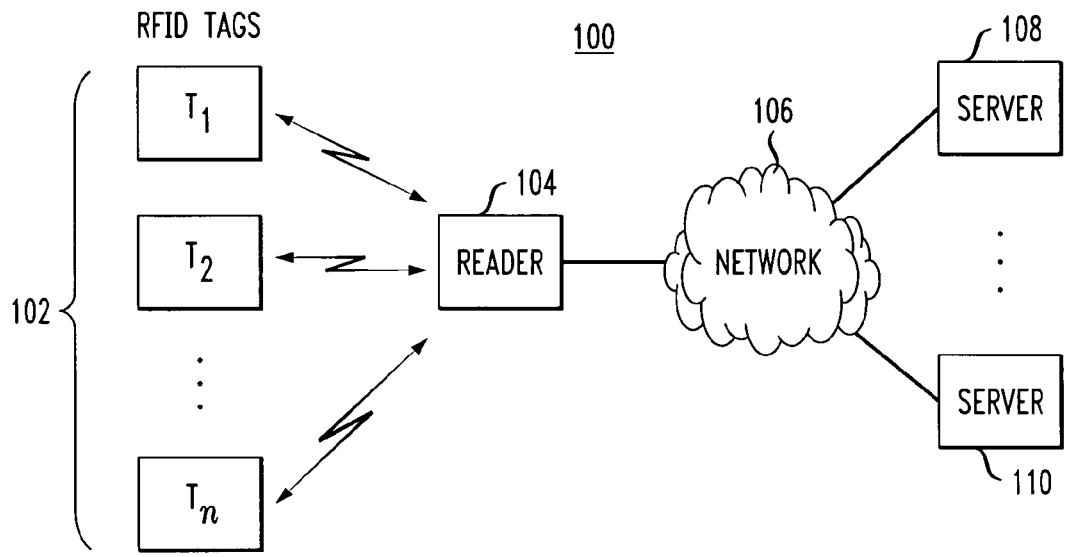
FIG. 1 is a simplified block diagram of an example RFID system in which the present invention is implemented.

The present invention will be described herein with reference to an exemplary RFID system in which multiple RFID devices communicate with an RFID device reader. It is to be appreciated, however, that the invention is not restricted to use in this or any other particular RFID system configuration.

The term "RFID device" as used herein is intended to include an RFID tag or any other type of device configurable for transmission of device-identifying information via radio frequency communications. Although the following description will refer primarily to RFID tags, it is to be understood that the techniques disclosed are more generally applicable to other types of RFID devices. Also, the terms "radio frequency" or "RF" as used herein are not intended to be restricted to any particular frequency range, but are instead intended to be construed more generally so as to encompass any contiguous or non-contiguous arrangement of one or more signal frequencies suitable for supporting wireless communication between at least one device and at least one reader.

Moreover, the invention can be implemented in a wide variety of non-RFID systems, each of which may comprise at least one device and at least one reader which communicates with the device. The latter systems may include systems which utilize forms of device-reader coupling other than wireless communication between the device and reader, including wired arrangements involving temporary or permanent physical coupling between the device and reader.

As will be described in greater detail below, a given RFID device in an illustrative embodiment of the invention may have one or more of a number of different classifications. For example, the given RFID device may be classified as one of public, private, blocker, unblocker, etc. The classification of the given RFID device may be dynamic, that is, it can vary over time. Also, it is possible for a given RFID device to have multiple classifications at the same time, depending upon the particular set of classifications in use.

The device-identifying information associated with a given RFID device may be a serial number or any other type of identifier. It should be noted that not every identifier in a given set of unique identifiers need have a corresponding realized device.

The term "identifier" as used herein is intended to include a pseudonym of the type described in the above-cited U.S. patent application Ser. No. 10/782,309. In addition, an identifier is intended to include any information suitable for providing an indication of a classification of a particular RFID device. As an example, a single stored bit that is controllable between a first state indicative of a private classification and a second state indicative of a public classification is considered to be a type of RFID device identifier, or may be a portion of an RFID device identifier, as that term is used herein. A given identifier may thus comprise a single-bit or a multiple-bit indicator.

The term "reader" as used herein is intended to include any type of device capable of interacting with an RFID tag or other device so as to receive device-identifying information therefrom.

FIG. 1 shows an RFID system 100 in which the present invention is implemented. The system 100 includes a number of RFID tags 102, more particularly denoted by their associated tag identifiers $T_1, T_2, \ldots T_n$, and an RFID reader 104. The reader 104 communicates with the tags 102 and receives identifying information therefrom, in the form of one or more transmitted identifiers. The reader 104 is coupled via a network 106 to servers denoted 108, 110.

A given RFID tag 102 in accordance with the invention generally includes circuitry comprising memory, processing logic and an RF transceiver. These elements may be configured in a manner similar to that used in conventional RFID tags.

One or more of the tags 102 may each comprise a so-called "blocker tag" configured with an ability to block the operation of a singulation algorithm utilized by the reader 104 in order to provide enhanced privacy for a user of the tag, as described in the above-cited U.S. patent application Ser. No. 10/673,540. The present invention, however, does not require the use of such blocker tags.

The network 106 may represent a global computer network such as the Internet, a wide area network (WAN), a local area network (LAN), a satellite network, a telephone or cable network, or various portions or combinations of these and other types of networks. The servers 108, 110 may be conventional processor-based information processing devices of a type conventionally utilized in conjunction with RFID readers in an RFID system.

The particular number n of tags 102 in the system 100 is purely arbitrary, and the system can be configured to support any desired number of tags. Also, although only a single reader 104 is shown in the figure for simplicity and clarity of illustration, the system will typically include multiple readers. Furthermore, it should be noted that a given reader need not be connected to a network, and may instead operate as a stand-alone device, or may be only intermittently connected to the network.

Figure 2:
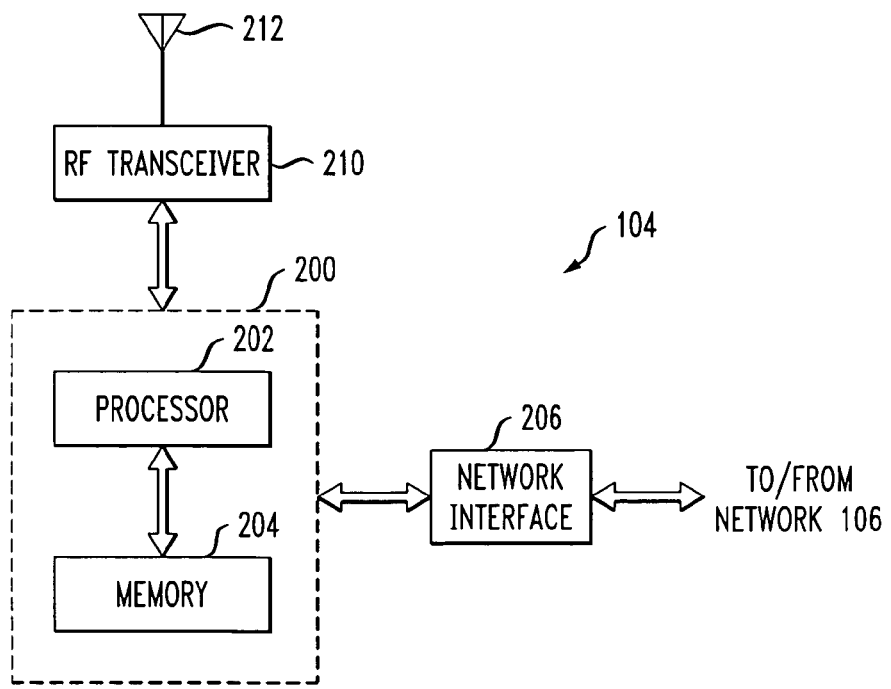
FIG. 2 illustrates one possible implementation of an RFID device reader of the FIG. 1 system.

FIG. 2 shows one possible implementation of the reader 104 of the FIG. 1 system. The reader in this implementation includes a processing block 200, comprising a processor 202 coupled to a memory 204, a network interface 206, an RF transceiver 210, and an antenna 212. One or more of these elements may be implemented in whole or in part as a conventional microprocessor, digital signal processor, application-specific integrated circuit (ASIC) or other type of circuitry, as well as portions or combinations of such circuitry elements. Software programs for controlling the operation of the reader 104 may be stored in the memory 204 and executed by the processor 202.

A typical RFID reader is generally only able to communicate with a single RFID tag at a time. In effect, however, the reader may be viewed as broadcasting a query to all of the tags 102 at once. If more than one tag responds to a query by the reader, the reader detects a collision and executes a singulation algorithm which allows the reader to communicate with the conflicting tags one at a time.

Conventional RFID tag systems typically operate at a frequency of either 13.56 MHz or 915 MHz. Those operating at 915 MHz commonly utilize a tree-walking singulation algorithm, while those operating at 13.56 MHz usually utilize an ALOHA singulation algorithm. Other frequencies, such as 125 kHz and 2.45 GHz, are also used, and employ similar singulation algorithms. Such algorithms are known in the art, and will therefore not be further described herein. The invention can be utilized with a reader incorporating one of these known singulation algorithms, or a reader incorporating another type of singulation algorithm, or any other type of reader, including a reader that does not singulate tags. Thus, it is to be appreciated that the invention does not require the use of singulation.

The present invention in an illustrative embodiment provides a selective blocking approach referred to herein as "soft blocking." Soft blocking generally offers somewhat weaker privacy enforcement than the complete blocking provided by a typical blocker tag of the type described in the above-cited U.S. patent application Ser. No. 10/673,540. It has the significant advantage, however, of being implementable with only minimal modification of standard RFID tags and readers. Additionally, soft blocking offers the possibility of flexible privacy policies in which only partial or scrubbed data is revealed for "private" tags, in lieu of the all-or-nothing policy enforced by a typical blocker tag. It can be shown that the correct functioning of a soft-blocking system may be rendered externally auditable with minor modifications to an otherwise conventional singulation algorithm or other tag-reading protocol. Another advantage is the ability to provide unblocking, a soft-blocking variant that permits an "opt-in" approach to consumer privacy.

A soft blocking technique of the present invention may be implemented, by way of example, in a system in which RFID tags or RFID readers are implemented in mobile telephones, portable computers or other similar devices. Such elements may be implemented in or otherwise comprise at least a portion of a mobile telephone, a portable computer, a personal digital assistant (PDA), a hardware-based authentication token such as an RSA SecurID® token commercially available from RSA Security Inc. of Bedford, Mass., U.S.A., or any other type of processing device utilizable in providing soft blocking functionality in accordance with the invention. The invention thus does not require any particular RFID device or reader configuration.

In the illustrative embodiment, soft blocking is implemented in the FIG. 1 system in the following manner. Identifiers transmitted by at least a subset of the RFID tags 102 are received by the reader 104. These received identifiers are then processed to determine their respective classifications.

As was indicated above, a given tag 102 in accordance with an aspect of the invention may have one or more of a number of classifications. For example, the given tag may be classified as public, private, blocker, unblocker, etc. The classification of a given one of the received identifiers may be determined from at least a portion of the identifier itself. As an example, a leading bit-pair of the form '11' in a tag identifier might indicate that the tag is a blocker. As one possible alternative, the classification of a given one of the received identifiers may be determined by utilizing the given identifier to perform a lookup operation in a directory or other RFID device database.

The system 100 is configured such that a privacy policy is implemented for data associated with one or more identifiers in a plurality of received identifiers, based at least in part on the classifications of the plurality of identifiers.

As an example, assume that each of the tags 102 can be classified as either a blocker device, a private device or a public device. That is, the set of tag classifications is {"blocker," "private," "public"}. If a plurality of received identifiers includes at least one identifier which is classified as corresponding to a blocker device, the system operates such that only data associated with identifiers of public devices is distributed to a back-end application or other data processing element of the system. On the other hand, if the plurality of received identifiers does not include at least one identifier which is classified as corresponding to a blocker device, the system operates such that the back-end application or other data processing element of the system receives data associated with identifiers of public devices and data associated with identifiers of private devices. Such an application or other data processing element may be implemented within one or more of the servers 108, 110, or elsewhere in the system 100.

Another example provides an illustration of the above-noted "opt-in" approach to consumer privacy, also referred to herein as unblocking. Assume for this example that each of the tags 102 can be classified as either an unblocker device, a private device or a public device. Accordingly, the set of tag classifications in this case is {"unblocker," "private," "public"}. If a plurality of received identifiers includes at least one identifier which is classified as corresponding to an unblocker device, the system operates such that the back-end application or other data processing element of the system receives data associated with identifiers of public devices and data associated with identifiers of private devices. On the other hand, if the plurality of received identifiers does not include at least one identifier which is classified as corresponding to an unblocker device, the system operates such that only data associated with identifiers of public devices is distributed to the back-end application or other data processing element of the system.

It should be noted that a classification of a given identifier may be changed, automatically or otherwise, from a first classification to a second classification under designated conditions. For example, in a retail environment in which the RFID tag corresponding to the given identifier is attached to a purchasable item, the classification of the given identifier may be automatically changed from a public device classification to a private device classification in conjunction with purchase of the item by a consumer. Such an arrangement could be used, in conjunction with an appropriate privacy policy, to protect the item from undesired reading once outside the retail environment. The policy in this case could be that data associated with private tags is not distributed. It should also be noted that consumers could alter the tag classification to public for items in their home so as to enable RFID use there, or readers in the home could be configured so as to not adhere to any privacy policy. Additionally, unblockers may be used to facilitate the return of previously-purchased items to the retail environment.

The blocker devices and unblocker devices mentioned above are examples of what are more generally referred to herein as "soft blocker devices" or simply "soft blockers." Soft blockers may comprise, for example, otherwise conventional RFID tags that communicate privacy preferences of their associated users via their assigned classification. As will be described elsewhere herein, audit mechanisms may be implemented in the RFID system to enforce reader respect for these privacy preferences.

It is possible for a reader to be configured to incorporate soft blocking functionality. For example, a reader of this type could be subject to special restrictions determining what tags it is permitted to scan and when. Thus, the classification of tags need not necessarily be read explicitly by the reader. The reader might have a policy such that it only queries public tags, for instance.

A reader in accordance with the present invention may also be configured such that it alters the particular type of scan query that it issues in order to implement a particular privacy policy in the presence of a soft blocker. In the absence of any soft blocker, the reader issues a first type of query, such as a query which is responded to by all tags. If there is a soft blocker tag present, the reader issues a second type of query, for example, a query that is responded to by only those tags which are classified as public tags. A more detailed example of an arrangement of this type will be described below with reference to FIG. 4.

A reader may also be configured to issue queries for which responses are conditioned on a single-bit or multi-bit piece of information stored in the tag. One such arrangement may utilize a single-bit portion of a tag identifier or other single-bit privacy indicator as stored in a given one of the tags. A single bit of this type, also referred to herein as a "privacy bit," may be controllable between a first state indicative of a private classification and a second state indicative of a public classification. These states are also referred to as "on" and "off" states, respectively. A reader may issue a query in the form of a "public" read command, i.e., one in which tags whose privacy bit is "on" are instructed not to respond. Alternatively, the reader may issue a "private" read command in which the only tags to respond are those whose privacy bit is "on." Similarly, the reader could issue a general read command to which all tags should respond irrespective of their privacy bit setting. It should be noted that soft blocking is achievable in this embodiment without any dependence on the underlying singulation algorithm employed by the RFID system.

Of course, numerous alternative soft blocking arrangements can be implemented in a straightforward manner, based on the present disclosure.

To enhance its auditability, a reader with soft blocking functionality of the type described above might broadcast a specification of its associated privacy policy prior to scanning tags in its vicinity. An external auditor can thereby determine whether a given reader is configured to implement a specified policy. Using the techniques described herein, an external auditor can further determine whether the reader is compliant with the policy specified by the soft blocker(s) present in its vicinity. As an alternative, soft blockers might be affixed to reader antennae, and such tags might even provide a visual indication, or other user-perceptible indication, of their associated policy.

This approach is somewhat less flexible than the direct possession of soft blockers by consumers. On the other hand, the enforcement of policy directly on readers also entirely removes from consumers the onus of blocker-tag management, as in the following example. Consider an arrangement in which readers used at point-of-sale stations in retail stores incorporate soft blocking functionality that forbids them to scan tags classified as "private." Such readers might further emit a "point-of-sale" policy identifier prior to scanning tags. This would permit an external auditor to determine if the reader is complying with the appropriate privacy policy.

Readers used for item returns in retail stores, in contrast, might be permitted to scan "private" tags. The power level of such readers, however, could be regulated. In particular, one can imagine that such readers might be permitted to emit only enough power to read tags at a very short distance when scanning for private tags.

As noted above, it would generally be appropriate for readers used in the home to carry no restriction on their scanning abilities.

Given this regulatory environment for readers, and good policy enforcement, a consumer could be assured that his or her tags are only scanned at home or when held in proximity to readers designated for item returns in a retail environment.

The process of determining identifier classifications and controlling data distribution based on the determined classifications is implemented in the illustrative embodiment in an element referred to herein as a tag privacy agent (TaPA).

Figure 3A:
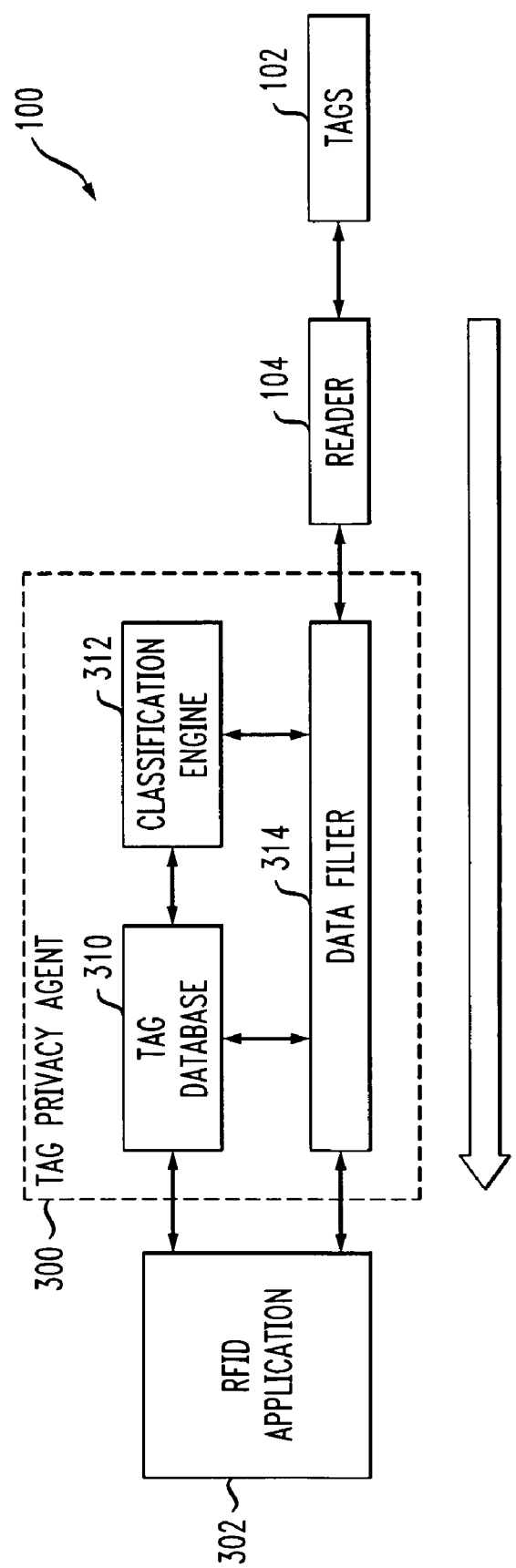
FIG. 3A is a more detailed view of a portion of the FIG. 1 system, showing a tag privacy agent arranged between the reader and a back-end application and configured to provide soft blocking functionality in accordance with the invention.

FIG. 3A provides a more detailed view of a portion of the FIG. 1 system, showing a TaPA 300 arranged between the reader 104 and a back-end RFID application 302. The TaPA 300 may comprise a system module or other processing element, which may be implemented in hardware, software, firmware or combinations thereof, and is generally configured to provide soft blocking functionality in accordance with the invention. More specifically, the TaPA 300 is operative to filter data output by the reader 104 before such data is provided to the back-end application 302. The TaPA 300 thus enforces privacy-policy compliance on an internal basis. As will be described below, it is also possible to render the TaPA 300 externally auditable.

As indicated previously, the tags 102 in the illustrative embodiment have associated classifications. These classifications are utilized by the TaPA 300 to determine what privacy policy should be implemented during a given reading session. For example, a tag classified as a blocker might cause the TaPA to filter out sensitive tag data, such as all data associated with private tags.

The privacy policies implemented by the TaPA 300 may be arbitrarily general, and the present invention is not limited in this regard. A given policy might rely on a combined view of several tag classifications. Indeed, different TaPAs may respond in different ways to the same classifications. For example, a medical unblocker tag may indicate to a particular TaPA that if that TaPA is associated with a certified medical entity, then it may distribute data from all tags of the medical classification, even if a blocker is present. Under other circumstances, presence of a blocker may generally indicate that medical tags should be treated as private. A given tag may therefore have multiple classifications, e.g., both "private" and "scannable by medical readers."

Another possibility is for blocking policy to apply just to certain data fields in tags. For example, an "enviroblocker" tag may cause a TaPA to block all data fields on private tags except the field containing the recycling number on plastic containers.

As another example, a privacy policy may pre-process data so as to hide individual data elements while harvesting data for the purpose of computing aggregate statistics, as in R. Agrawal et al., "Privacy-preserving data mining," Proc.

of the ACM SIGMOD Conference on Management of Data, pp. 439-450, ACM Press, 2000.

Yet another possibility is a policy that "mixes" or randomly permutes data so as to dissociate the data from tag identities or from other linked data elements, essentially as a mix network or single mix server of the type described in D. Chaum, "Untraceable electronic mail, return addresses, and digital pseudonyms," Communications of the ACM, 24(2):84-88, 1981.

These and numerous other privacy policies can be implemented using the soft blocking techniques of the present invention.

The illustrative embodiment of TaPA 300 as shown in FIG. 3 includes three primary components, namely, a tag database (DB) 310, a classification engine (CE) 312, and a data filter (DF) 314. Each of these TaPA components will be described in greater detail below. It should be noted that the components, although shown separately in the figure, may be combined into other arrangements of one or more elements providing the described functionality. For example, the classification and filtering functions may be combined into a single element such that there is no distinct classification engine. Thus, separation of the TaPA into the particular components shown in the figure is for notational clarity, and should not be viewed as limiting the scope of the invention in any way.

It is also assumed for simplicity of description that all tags emit unique identifiers in response to reader queries, although it is to be appreciated that the described techniques are also applicable to other forms of tag data.

The tag database DB is a set $\{T_i, S_i\}_{i=1}^n$ of tag identifiers $T_i$ and associated data $S_i$. $S_i$ might include such data as tag classifications, history, "kill" PINs, access control information, and so forth. DB might be a private information store or, alternatively, a public directory supported by, e.g., the Object-Name Service (ONS), described in Auto-ID Object Name Service (ONS) 1.0, Auto-ID Working Draft, M. Mealling, ed., 12 Aug. 2003.

The classification engine CE is an algorithm that takes as input a set of tag identifiers $\{T_i\}_{i=1}^m$ and associated auxiliary data $\{D_i\}_{i=1}^m$ (e.g., tag manufacturer number, tag type, etc.) released by tags upon query. From a pre-established (possibly standardized) set $\Gamma$, it outputs tag classifications $\{\gamma_i\}$. CE may access DB in computing $\gamma$. CE might in some cases be implemented as a simple algebraic function $f: \{0,1\}^k \rightarrow \Gamma$ on k-bit identifiers.

The data filter DF is an algorithm that takes as input a set of tag identifiers $\{T_i\}_{i=1}^m$ and associated auxiliary data $\{D^j\}_{i=1}^m$ released by tags upon query. DF calls upon CE to obtain the classifications of tags it processes. It may additionally access DB while performing its computation. DF emits filtered tag-associated data according to a designated privacy policy P. As indicated above, P may be any desired privacy policy. It may be dependent on external factors, e.g., time-of-day, etc.

The data filter DF may be viewed as the core of the TaPA. It is here that the privacy policy P of the TaPA is implemented.

It is important to note that the first m tag identifiers are not necessarily taken as input in this embodiment. Rather, the limits 1 . . . m are used for notational convenience.

A simple example illustrating the operation of TaPA 300 is as follows. Assume for this example that the classification set is $\Gamma = \{$"blocker," "private," "public"$\}$, as in another example previously described herein. As will become apparent, use of the database DB is not required in the present example. The classification engine CE may comprise a simple function $f$ on the first two bits of a tag identifier that maps '00' and '01' to "blocker," '10' to "private," and '11' to "public." In this case, any tag with an identifier possessing a leading '0' would serve as a blocker. Upon receipt of input comprising a set $\{T_i\}_{i=1}^m$, the data filter DF would perform the following steps:

1. Call on CE to compute classifications $G = \{\gamma_i = f(T_i)\}_{i=1}^m$;
2. If "blocker" $\in G$, then output $\{T_i : 1 \leq i \leq m, \gamma_i = $ "public"$\}$; otherwise, output $\{T_i\}_{i=1}^m$.

As one possible alternative, it would be straightforward to implement this system using database DB, rather than a classification function $f$. The database in this case would associate with each tag identifier $T_i$ its classification $\gamma_i$ in $\Gamma$. The classification engine CE would then perform a simple lookup to determine the classification of a given tag.

Although illustratively shown in FIG. 3A as being separate from the reader 104 and back-end application 302, the TaPA 300, or one or more components thereof, may be implemented within the reader 104 or within the back-end application 302. Also, TaPA 300 could be physically implemented on a shared processing platform with at least one of the reader 104 and the back-end application 302, while remaining fully or partially logically separated therefrom. Furthermore, it should be noted that the particular TaPA components and their associated interconnections as shown in FIG. 3A are not requirements of the invention, and the invention can be implemented using numerous alternative arrangements of hardware, software or firmware components.

As mentioned above, the policy P in DF can be arbitrarily sophisticated. It might dictate not only which tags are visible to the TaPA, but also which associated information in DB is made available during a given scanning session. It can also incorporate information external to a TaPA. For example, a TaPA in a restaurant might be permitted to read "private" tags outside of business hours for the personal use of staff. It might determine the time of day from an internal clock or even a remote call to a web site.

Furthermore, it is important to recognize that P might govern not just the logical environment of a reader, but its physical parameters as well. For example, a given soft blocker may require a reader to broadcast at low power, and thus to scan at only short distances, when reading "private" tags.

With regard to tag classification changes, the classification of a tag may be readily changed through modification of an associated database entry in DB. Such a change may be local in nature, unless DB is a globally accessible database such as the above-noted ONS. It should be noted, however, that the ONS may not contain tag data for all domains, but may merely point to one or more servers where such data are accessible.

A particular concern is a change in classification of a tag from "public" to "private." By way of example, if Shop A flags tag T in its database as having the classification "private," Shop B will not necessarily have any awareness of this, and therefore will not respect the classification. A better approach in such cases will often be to change a classification indicator on the tag itself.

This is straightforward in an embodiment in which the tag contains flash memory or other type of programmable memory. Such memory, however, is usually expensive. A simpler mechanism is possible for many practical applications. In particular, tags may be designed such that a classification change from "public" to "private" is possible as a (possibly PIN-protected) one-time operation involving the modification of a single bit in the tag identifier. This may be achieved very inexpensively in existing tag hardware.

A given embodiment of the present invention may incorporate an external auditability mechanism, as will now be described in conjunction with FIG. 3B and FIG. 4. External auditability is obtained in the illustrative embodiment through the use of selective scanning. In other words, the reader should scan only those portions of the tag-identifier space to which it is entitled, such that an independent RFID device or other external auditor may determine reader compliance by examining the scanning patterns of the reader. The reader can thus demonstrate via its issued commands that it is respecting a particular privacy policy. To support this functionality, an additional component, referred to herein as a reader driver (RD), is implemented in the TaPA 300, as will now be described with reference to FIG. 3B.

FIG. 3B shows a portion of an RFID system 100' which incorporates a TaPA 300' having an RD component 320. Generally, the RD is coupled between the reader 104 and the DF component 314 of the TaPA 300'. The RD interacts dynamically with reader 104, indicating what portions of the tag-identifier space the reader should scan.

In an embodiment incorporating the RD, it is advantageous to determine the tag classifications through a partitioning of the tag-identifier space. FIG. 4 is a flow diagram showing the interactions between the RD and the reader 104 in such an embodiment.

Let $Z=\{Z_0, Z_1, \ldots, Z_m\}$ be a collection of non-overlapping identifier sets, referred to herein as zones. Let tags specifying a privacy policy have identifiers residing in the zone $Z_0$. The tag scanning, then, may involve a two-phase process. First, as indicated in steps 400 and 402 of FIG. 4, the reader scans identifiers in $Z_0$, and transmits the output to the RD. The identifiers (and other tag data) retrieved from this initial scanning phase are utilized by the RD to determine the privacy policy to be enforced and, in particular, what subset $Z \in Z$ the reader is permitted to scan. The RD communicates any scanning restriction to the reader. The second reading phase corresponds to steps 404 and 406. If the RD indicates that there is no scanning restriction, the reader scans all the zones in Z, as indicated in step 404. Alternatively, if the RD indicates that there is a scanning restriction, the reader scans only a designated subset of the zones, consistent with the determined privacy policy, as indicated in step 406. Variants with more than two phases can be implemented in a straightforward manner, as will be appreciated by those skilled in the art.

An auditing device associated with the system can readily determine whether or not a given reader is adhering to a particular privacy policy. For example, in the case of a standard tree-walking algorithm, at each stage of the reading process, the reader specifies a prefix. Only tags whose identifiers have this prefix participate in the communication protocol. Such tags are referred to herein as "communicating" tags. If the reader ever specifies a prefix that corresponds to identifiers in a zone that the reader should not scan, then it may be determined to be in breach of the privacy policy. Similarly, standard implementations of the ALOHA algorithm have provisions for identifier-prefix specification. A similar approach to auditing may be adopted in this case.

Consider again the example described previously, in which the set of tag classifications is {"blocker," "private," "public"}. In an auditable implementation of such an arrangement, $Z_0$ may consist of all identifiers with a leading '0' bit, $Z_1$ may consist of all identifiers with the leading bit pair '10,' and $Z_2$ may consist of all identifiers with the leading bit pair '11'. Tags in $Z_0$ are "blockers." Those in $Z_1$ are "private" and those in $Z_2$ are "public." The policy P, then, is such that if any tag is detected in $Z_0$, i.e., any tag with a leading '0' bit, then only identifiers in $Z_2$ should be returned. Otherwise, identifiers from $Z_1$ and $Z_2$, i.e., all identifiers with leading '1' bits, are returned.

This system may easily be audited as follows. In the first reading phase, the reader should specify a '0' prefix for all communicating tags. In the second reading phase, if the first phase indicated the presence of a blocker, then the reader should specify the prefix '11' for all communicating tags. If the reader specifies in the first phase a prefix that permits communication by any tag with a leading '1' bit, or if, in the presence of a blocker, the reader specifies in the second phase a prefix that permits communication by any tag with a leading '10' bit pair, then the reader may be deemed to violate the privacy policy.

In one possible embodiment, an auditor may be configured to use a special-purpose device to simulate a set of tags of various classifications and record all values broadcast by a reader. This would permit the detection of breaches of a particular privacy policy. Given a widely adopted set of privacy policies, it would be possible to manufacture small devices that would function automatically, illuminating an LED or otherwise informing an auditor when a non-compliant reader is encountered. Numerous other auditing device arrangements may be used in conjunction with the invention, as will be appreciated by those skilled in the art.

A prototype RFID system incorporating an embodiment of the invention of the type shown in FIG. 3A has been implemented. The system used Tag-It™ high-frequency (HF) RFID tags, manufactured by Texas Instruments, which measure approximately 55 mm×110 mm and operate at a frequency of 13.56 MHz. The system used a ThingMagic™ Mercury 3 model reader. Back-end application software was implemented in C++, using the Microsoft Foundation Classes (MFC) for the user interface. Communication between the back-end application and the reader was managed by a subclass of the MFC CSocket class called a CRFIDReaderSocket. The CRFIDReaderSocket object maintained the network connection to the reader and periodically queried the reader, using simple SQL queries. Reader responses were parsed and stored in a list of tags currently "visible" to the reader. The application received tag information from the CRFIDReaderSocket, performed the classification algorithm, then updated its display accordingly. A Microsoft Access database, shared among multiple applications, was used to store the status of each tag. The database was updated with user-supplied data after the completion of a given transaction. A set of laptop computers, each equipped with a reader of the type described above and an external monitor as a peripheral, served as point-of-sale terminals for the prototype system.

The classification engine in this prototype used a classification scheme in which blocker tags were distinguished by their serial numbers. In particular, blocker tags contained serial numbers residing in a specially designated partition S of the full identifier space for tags. The tag zoning, in this case public or private status, was determined by reference to the database. This allowed quick identification of blocker tags without requiring modification of tag identifiers to change status.

Using the terminology of the FIG. 3A embodiment, the classification engine CE in the prototype system took as input the serial number n of a tag. If $n \in S$, then the tag was classified as a blocker; otherwise, CE consulted DB to determine whether the tag was registered "private" or "public." The policy of the filter DF was then simple: If the set of tags presented to the filter included a blocker, then the filter output only the serial numbers of tags marked as "public"; otherwise DF output all tag serial numbers.

In a demonstration using the prototype system, the tags were affixed to bottles of a type suitable for containing prescription medications. Additional tags, designated as blocker tags in the manner described above, were affixed to bags in which the bottles were placed after a "sale" to a customer. The prototype system generally functioned as designed, but some sensitivity to tag orientation was apparent. The power available to the particular RFID tag used in the prototype system on scanning depends on the area the tag presents perpendicular to the field emitted by the antenna. Thus, when a blocker was aligned nearly parallel to this field, it would sometimes not be scanned properly. It was also found that when a given blocker was attached too high on a bag, and thus at a distance from the tag on the bottle inside the bag, the blocker would sometimes be unable to disrupt scanning of the bag contents. However, when blockers were attached on the lower portion of bags, they proved very effective at most angles of presentation, including those in which the bags were scanned with the blocker positioned away from the reader antenna.

Thus, it is important that system factors such as tag limitations, tag placement and reader antenna configuration be considered in a given implementation of this type. For example, alternative tags may be used to provide improved performance relative to the prototype system. Numerous suitable tag placements and antenna configurations for a given embodiment will be readily apparent to those skilled in the art.

In certain applications, an "opt-in" approach involving unblockers may prove attractive as a way of ensuring privacy as a default in the event of system failures. With this approach, a scanning failure would cause private information to remain undisclosed, even when an unblocker is in fact present to authorize disclosure.

It is to be appreciated that the particular configuration, elements and operating parameters of the prototype system are not requirements of the invention, and should not be construed as limiting the scope of the invention in any way.

For example, the system elements and their configuration as shown in FIGS. 1, 2, 3A and 3B may be varied in alternative embodiments. Similarly, the process steps in the FIG. 4 flow diagram can be varied in alternative embodiments.

In addition, although described in the context of tree-walking and ALOHA singulation algorithms, the techniques of the present invention may be implemented in systems which utilize other types of singulation algorithms, or more generally in systems which utilize other techniques for allowing a reader to determine the unique identifiers associated with various RFID devices.

Furthermore, the various simplifying assumptions made above in the course of describing the illustrative embodiments should also be viewed as exemplary rather than as requirements or limitations of the invention. In alternative embodiments, one or more of these assumptions need not apply.

These and numerous other alternative embodiments within the scope of the appended claims will be readily apparent to those skilled in the art.

What is claimed is:

1. A method for use in an RFID system comprising a plurality of RFID devices and at least one reader which communicates with one or more of the devices, the method comprising the steps of:
   receiving identifiers transmitted by the RFID devices;
   determining a classification of at least one of the received identifiers; and
   implementing a privacy policy for data associated with one or more of the received identifiers based at least in part on the determined classification;
   wherein if a given one of the received identifiers is determined to have a classification of a specified type, the privacy policy implemented for data associated with another of the received identifiers is altered based on that determination.

2. The method of claim 1 wherein the data associated with a given received identifier comprises the identifier itself.

3. The method of claim 1 wherein the classification of a given received identifier is determined from at least a portion of the identifier itself.

4. The method of claim 1 wherein the classification of a given received identifier is determined by utilizing the identifier to perform a lookup operation in a database.

5. The method of claim 1 wherein the identifier of a given RFID device is controllable between at least a first state indicative of a first classification and a second state indicative of a second classification.

6. The method of claim 5 wherein the first classification comprises a private device classification and the second classification comprises a public device classification.

7. The method of claim 1 wherein the reader alters a type of query that it issues based at least in part on the determined classification.

8. The method of claim 1 wherein a given RFID device can be classified as either a blocker device, a private device or a public device.

9. The method of claim 1 wherein if the received identifiers include at least one identifier which is classified as corresponding to a blocker device, the implementing step operates such that only data associated with identifiers of public devices is distributed to a designated data processing element of the system.

10. The method of claim 1 wherein if the received identifiers do not include at least one identifier which is classified as corresponding to a blocker device, the implementing step operates such that data associated with identifiers of public devices is distributed to a designated data processing element of the system and data associated with identifiers of private devices is distributed to the designated data processing element.

11. The method of claim 1 wherein a given RFID device can be classified as either an unblocker device, a private device or a public device.

12. The method of claim 1 wherein if the received identifiers include at least one identifier which is classified as corresponding to an unblocker device, the implementing step operates such that data associated with identifiers of public devices is distributed to a designated data processing element of the system and data associated with identifiers of private devices is distributed to the designated data processing element.

13. The method of claim 1 wherein if the received identifiers do not include at least one identifier which is classified as corresponding to an unblocker device, the implementing step operates such that only data associated with identifiers of public devices is distributed to a designated data processing element of the system.

14. The method of claim 1 wherein a classification of the identifier of a given RFID device is changed from a first classification to a second classification under designated conditions.

15. The method of claim 14 wherein the given RFID device is attached to a purchasable item, and the classification of its identifier is changed from a public device classification to a private device classification in conjunction with a purchase of the item.

16. The method of claim 1 wherein the implementing step operates such that only a designated portion of the data associated with the received identifiers is distributed to a designated data processing element of the system, the designated portion being a function of the determined classifications.

17. The method of claim 16 wherein the data processing element of the system comprises a back-end application of the system.

18. The method of claim 1 wherein the reader is configured to transmit information specifying a particular privacy policy implemented in the system for device data obtained by the reader.

19. The method of claim 1 wherein the privacy policy is implemented in a privacy agent of the system, the privacy agent comprising a database, a classification engine and a data filter.

20. The method of claim 19 wherein the database comprises a set $\{T_i, S_i\}_{i=1}^{n}$ of device identifiers $T_i$ and additional associated data $S_i$.

21. The method of claim 19 wherein the classification engine comprises an algorithm that takes as input a set of identifiers $\{T_i\}_{i=1}^{m}$ and additional associated data $\{D_i\}_{i=1}^{m}$ released by the RFID devices upon query by the reader, and outputs particular classifications of the identifiers $\{T_i\}_{i=1}^{m}$.

22. The method of claim 19 wherein the data filter takes as input a set of identifiers $\{T_i\}_{i=1}^{m}$ and additional associated data $\{D_i\}_{i=1}^{m}$ released by the RFID devices upon query by the reader, obtains corresponding classifications from the classification engine, and outputs filtered data according to the privacy policy.

23. The method of claim 1 wherein the privacy policy is implemented at least in part utilizing a reader driver, the reader driver interacting with the reader to indicate to the reader particular portions of a device identifier space that the reader should scan, the device identifier space comprising the identifiers of the plurality of RFID devices.

24. The method of claim 23 wherein the device identifier space comprises a plurality of zones $Z=\{Z_0, Z_1, \ldots, Z_m\}$, and the interaction between the reader and the reader driver comprises the steps of:
the reader scanning device identifiers in $Z_0$ and transmitting associated data to the reader driver;
the reader driver utilizing the associated data to determine the privacy policy; and
the reader driver communicating to the reader information identifying at least a particular subset $Z \epsilon Z$ of zones that the reader is permitted to scan in accordance with the privacy policy.

25. The method of claim 1 wherein an auditing device of the system is operative to determine whether or not a given reader is adhering to the privacy policy.

26. The method of claim 7 wherein if the received identifiers include at least one identifier having a first classification, the reader issues a query that requests a response from only those RFID devices whose identifiers have a second classification.

27. The method of claim 26 wherein if the received identifiers do not include at least one identifier having the first classification, the reader issues a query that requests a response from one or more RFID devices without regard to the classification of their identifiers.

28. The method of claim 1 wherein the reader is configured to issue a query for which a corresponding response by a given one of the RFID devices is conditioned on information stored in the given RFID device.

29. The method of claim 28 wherein the stored information comprises a privacy bit controllable between a first state indicative of a private classification and a second state indicative of a public classification.

30. The method of claim 29 wherein the reader is configured to issue a private read command which requests responses from only those RFID devices having a privacy bit in the first state.

31. The method of claim 29 wherein the reader is configured to issue a public read command which requests responses from only those RFID devices having a privacy bit in the second state.

32. The method of claim 29 wherein the reader is configured to issue a general read command which requests responses from all the RFID devices without regard to the states of their privacy bits.

33. The method of claim 28 wherein reader configuration can be changed dynamically.

34. An apparatus for use in an RFID system comprising a plurality of RFID devices and at least one reader which communicates with one or more of the devices, the apparatus comprising:
an RFID device configurable into at least a first state indicative of a first classification and a second state indicative of a second classification;
wherein the system upon receipt of identifiers transmitted by the RFID devices is operative to determine a classification of at least one of the received identifiers, and to implement a privacy policy for data associated with one or more of the received identifiers based at least in part on the determined classification; and
wherein if a given one of the received identifiers is determined to have a classification of a specified type, the privacy policy implemented for data associated with another of the received identifiers is altered based on that determination.

35. An apparatus for use in an RFID system comprising a plurality of RFID devices and at least one reader which communicates with one or more of the devices, the apparatus comprising:
an RFID device configurable into at least a first state indicative of a first classification and a second state indicative of a second classification;
the RFID device being further configured to receive from the reader a query for which response by the RFID device is conditioned on the state of the RFID device;
the system thereby implementing a privacy policy for data associated with one or more RFID device identifiers received by the reader, based at least in part on one or more classifications determined for the one or more received identifiers;
wherein if a given one of the received identifiers is determined to have a classification of a specified type, the privacy policy implemented for data associated with another of the received identifiers is altered based on that determination.

36. An RFID system comprising:
at least one RFID device; and
at least one reader which communicates with the RFID device;
the reader receiving an identifier transmitted by the RFID device; the system being operative to determine a classification of the received identifier, and to implement a privacy policy for data associated with the received identifier based at least in part on the determined classification;
wherein if a given one of the received identifiers is determined to have a classification of a specified type, the privacy policy implemented for data associated with another of the received identifiers is altered based on that determination.

37. A method for use in an RFID system comprising a plurality of RFID devices and at least one reader which communicates with one or more of the devices, the method comprising the step of:

configuring a given one of the RFID devices in one of at least a first state indicative of a first classification and a second state indicative of a second classification;

wherein response by the given RFID device to a query received from the reader is conditioned on the state of the RFID device;

the system thereby implementing a privacy policy for data associated with one or more RFID device identifiers received by the reader, based at least in part on one or more classifications determined for the one or more received identifiers;

wherein if a given one of the received identifiers is determined to have a classification of a specified type, the privacy policy implemented for data associated with another of the received identifiers is altered based on that determination.

* * * * *